United States Patent
Kramer et al.

(10) Patent No.: US 7,349,537 B2
(45) Date of Patent: Mar. 25, 2008

(54) METHOD FOR DATA ENCRYPTION IN AN ETHERNET PASSIVE OPTICAL NETWORK

(75) Inventors: Glen Kramer, Petaluma, CA (US); Lawrence D. Davis, Petaluma, CA (US); Edward W. Boyd, Petaluma, CA (US); Ryan E. Hirth, Windsor, CA (US); Ngo Thahn Ho, Arlington, TX (US)

(73) Assignee: Teknovus, Inc., Petaluma, CA (US)

( * ) Notice: Subject to any disclaimer, the term of this patent is extended or adjusted under 35 U.S.C. 154(b) by 92 days.

(21) Appl. No.: 11/078,923

(22) Filed: Mar. 10, 2005

(65) Prior Publication Data

US 2005/0201554 A1 Sep. 15, 2005

Related U.S. Application Data

(60) Provisional application No. 60/579,449, filed on Jun. 14, 2004, provisional application No. 60/565,882, filed on Apr. 27, 2004, provisional application No. 60/552,152, filed on Mar. 11, 2004.

(51) Int. Cl.
  *H04K 1/00* (2006.01)
  *H04L 9/00* (2006.01)
  *H04L 9/28* (2006.01)
  *H04J 14/00* (2006.01)

(52) U.S. Cl. ............................ 380/28; 380/28; 380/256; 380/277; 380/284; 398/71; 713/160

(58) Field of Classification Search ................. 380/28, 380/256, 277, 284; 398/71; 713/160
  See application file for complete search history.

(56) References Cited

U.S. PATENT DOCUMENTS

| | | | |
|---|---|---|---|
| 6,870,836 B1 * | 3/2005 | Dyke et al. | 370/355 |
| 2004/0028409 A1 * | 2/2004 | Kim et al. | 398/71 |
| 2004/0073788 A1 * | 4/2004 | Kim et al. | 713/160 |
| 2004/0136534 A1 * | 7/2004 | Stiscia et al. | 380/256 |
| 2004/0196862 A1 * | 10/2004 | Song et al. | 370/442 |
| 2005/0008158 A1 * | 1/2005 | Huh et al. | 380/256 |
| 2005/0047602 A1 * | 3/2005 | Lee et al. | 380/284 |

\* cited by examiner

*Primary Examiner*—Ayaz Sheikh
*Assistant Examiner*—Shin-Hon Chen
(74) *Attorney, Agent, or Firm*—Park, Vaughan & Fleming LLP; Shun Yao

(57) ABSTRACT

One embodiment of the present invention provides a system that decrypts downstream data in an Ethernet passive optical network (EPON). During operation, the system receives a data frame which is encrypted based on a remote input block and a session key, wherein the remote input block is constructed based on a remote cipher counter and a remote block counter. The system adjusts a local cipher counter based on a received checksum located in a preamble of the data frame, wherein the local cipher counter is substantially synchronized with the remote cipher counter. In addition, the system truncates the local cipher counter by discarding n least significant bits thereof. The system then constructs a local input block based on the truncated cipher counter and a local block counter for the received data frame. Next, the system decrypts the data frame based on the local input block and the session key.

24 Claims, 7 Drawing Sheets

| | |
|---|---|
| DA = 01-80-C2-00-00-02 | 6 |
| SA | 6 |
| Length/type = 88-89 | 2 |
| Subtype = 0x03 | 1 |
| flags | 2 |
| Code = 0xEE | 1 |
| OUI = FF-FF-FF | 3 |
| message_type | 1 |
| options | 2 |
| cipher_counter | 2 |
| switch_counter | 6 |
| [key] | 16 |
| pad | 12 |
| FCS | 4 |

METHOD FOR DATA ENCRYPTION IN AN ETHERNET PASSIVE OPTICAL NETWORK

RELATED APPLICATION

This application hereby claims priority under 35 U.S.C. § 119 to the following provisional patent applications: U.S. Provisional Patent Application No. 60/552,152 filed on 11 Mar. 2004, entitled "Method for Data Encryption in Ethernet Passive Optical Network," by inventors Glen Kramer, Lawrence D. Davis, and Edward W. Boyd, U.S. Provisional Patent Application No. 60/565,882 filed on 27 Apr. 2004, entitled "Method for Data Encryption in Ethernet Passive Optical Network," by inventors Glen Kramer, Lawrence D. Davis, and Edward W. Boyd, and U.S. Provisional Patent Application No. 60/579,449 filed on 14 Jun. 2004, entitled "Method and Apparatus for EPON Encryption Based on Cycle Counter," by inventor Glen Kramer, Ryan E. Hirth, and Ngo Thanh Ho.

BACKGROUND

1. Field of the Invention

The present invention relates to the design of Ethernet passive optical networks. More specifically, the present invention relates to a method and an apparatus for encrypting and decrypting data to improve the security of an Ethernet passive optical network.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies that are presently being developed, Ethernet passive optical networks (EPONs) are one of the best candidates for next-generation access networks. EPONs combine ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and, consequently, require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

One challenge in designing an EPON is to improve an EPON's security. Security concerns in an EPON arise because an EPON typically serves non-cooperative, private users through a broadcasting downstream channel. This channel can potentially become available to any interested party capable of operating an end station in a promiscuous mode. In general, to ensure EPON security, a network operator needs to guarantee subscriber privacy. Hence, mechanisms to control subscribers' access to the infrastructure are critical. Unfortunately, conventional encryption methods are not the best choice because they often involve modification of the underlying communication protocols. Such modifications can potentially interfere with other extensions and development of these protocols.

Hence, what is needed is a method for encrypting and decrypting data in an EPON while minimizing interference with future extensions of existing protocols.

SUMMARY

One embodiment of the present invention provides a system that decrypts downstream data in an Ethernet passive optical network (EPON). During operation, the system receives a data frame which is encrypted based on a remote input block and a session key, wherein the remote input block is constructed based on a remote cipher counter and a remote block counter. The system adjusts a local cipher counter based on a received checksum located in the preamble of the data frame, wherein the local cipher counter is substantially synchronized with the remote cipher counter. In addition, the system truncates the local cipher counter by discarding n least significant bits thereof. The system then constructs a local input block based on the truncated cipher counter and a local block counter for the received data frame. Next, the system decrypts the data frame based on the local input block and the session key.

In a variation of this embodiment, the checksum is a cyclic redundancy checksum (CRC). Furthermore, adjusting the local cipher counter involves computing a cyclic redundancy checksum (CRC) for the received data frame. The system also compares the computed CRC with the received CRC attached to the received data frame. If the computed CRC is equal to the received CRC, the system sets an expected value of the (n−1)th bit of the local cipher counter to "1." If the computed CRC is the inversion of the received CRC, the system sets the expected value of the (n−1)th bit of the local cipher counter to "0.".

In a further variation, if the (n−1)th bit of the local cipher counter is not equal to the expected value thereof, and if the decimal value of the least significant n bits of the untruncated local cipher counter is greater than or equal to $2^{(n-1)}$, adjusting the local cipher counter involves incrementing the (n+1)th bit of the local cipher counter by one and performing necessary carry-overs. If the (n−1)th bit of the local cipher counter is not equal to the expected value thereof, and if the decimal value of the least significant n bits of the untruncated local cipher counter is less than $2^{(n-1)}$, adjusting the local cipher counter involves decrementing the (n+1)th bit of the local cipher counter by one and performing necessary carry-overs.

In a variation of this embodiment, the untruncated local cipher counter is 48-bit long. Furthermore, the least significant 32 bits of the untruncated local cipher counter is identical to a local multi-point control protocol (MPCP) counter, and n is equal to 5. The system increments the 48-bit long untruncated local cipher counter every 16 ns. In addition, constructing the local input block involves: concatenating the truncated local cipher counter with a block counter to obtain a 50-bit value, wherein the block counter is 7-bit long and is reset to zero for every data frame; and duplicating the 50-bit value to fill a 128-bit space for the local input block starting from the least significant bit.

In a further variation, decrypting the received data frame involves encrypting the local input block with the session key based on the Advanced Encryption Standard (AES) to obtain a local output block. Furthermore, decrypting the receive data frame involves performing an exclusive OR (XOR) operation on a 128-bit block within the received data frame and the local output block to obtain a 128-bit block of unencrypted data, wherein the 128-bit block corresponds to the block counter.

In a further variation, the system receives the 16 most significant bits of the remote cipher counter which is 48-bit long. In addition, the system concatenates the local MPCP counter with the received 16 bits to obtain the 48-bit local cipher counter, thereby substantially synchronizing the local cipher counter with the remote cipher counter.

One embodiment of the present invention provides a system that encrypts downstream data in an EPON. During operation, the system receives an unencrypted data frame. The system then modifies a checksum located in a preamble of the data frame based on a cipher counter. Next, the system truncates the cipher counter by discarding n least significant bits thereof. Furthermore, the system constructs an input block based on the truncated cipher counter and a block counter for the data frame. The system subsequently encrypts the data frame based on the input block and a session key.

In a variation of this embodiment, modifying the checksum for the data frame involves setting the checksum to be a CRC for the data frame if the (n+1)th bit of the cipher counter is equal to "1;" and setting the checksum to be the inversion of the CRC for the data frame if the (n+1)th bit of the cipher counter is equal to "0."

In a variation of this embodiment, the untrucated cipher counter is 48-bit long. Furthermore, the lower 32 bits of the untruncated cipher counter is identical to a multi-point control protocol (MPCP) counter, and n is equal to 5. The system increments the 48-bit long untruncated cipher counter every 16 ns. In addition, constructing the input block involves: concatenating the truncated cipher counter with a block counter to obtain a 50-bit value, wherein the block counter is 7-bit long and reset to zero for every data frame; and duplicating the 50-bit value to fill a 128-bit space for the input block starting from the least significant bit.

In a further variation, encrypting the data frame involves encrypting the input block with the session key based on AES to obtain an output block. Encrypting the data frame also involves performing an exclusive OR (XOR) operation on a 128-bit block within the data frame and the output block to obtain a 128-bit block of encrypted data for the data frame, wherein the 128-bit block corresponds to the block counter.

In a further variation, the system sends the 16 most significant bits of the cipher counter to a optical network unit (ONU), so that the ONU's cipher counter can be substantially synchronized.

In a further variation, incrementing the 48-bit long untruncated cipher counter involves incrementing the MPCP counter every 16 ns. The system also maintains a 16-bit cycle counter which is incremented when the MPCP counter rolls over. Furthermore, the system maintains a register for the ONU which contains the value of the cycle counter when an encryption key associated with the ONU is last changed. The system then obtains a 16-bit value by subtracting the value in the register from the value of the cycle counter.

Next, the system obtains the 48-bit long cipher counter by concatenating the 16-bit value with the MPCP counter.

One embodiment of the present invention provides a system that encrypts and decrypts upstream data from an optical network unit (ONU) to an optical line terminal (OLT) in an EPON. During operation, the system receiving a message from the OLT which assigns a starting time of a transmission slot during which the ONU can transmit one or more data frames. The system then sets an ONU-side cipher counter at the ONU based on the assigned starting time for the transmission slot. Next, the system encrypts the data frames to be transmitted within the transmission slot based on the local cipher counter.

In a variation of this embodiment, the system assigns the starting time of the transmission slot to the ONU. In addition, the system sets an OLT-side cipher counter at the OLT based on the starting time of the transmission slot assigned to the ONU and an expected round-trip delay from the ONU to the OLT.

BRIEF DESCRIPTION OF THE FIGURES

FIG. 9 illustrates an exemplary format of a key exchange message in accordance with one embodiment of the present invention.

Table 1 illustrates a pseudo code for inverting a CRC for the data frame to reflect the value of bit 5 of the cipher counter in accordance with an embodiment of the present invention.

Table 2 illustrates a pseudo code for recovering the value of bit 5 of the cipher counter by comparing the received CRC with a calculated CRC for the data frame in accordance with an embodiment of the present invention.

Table 3 illustrates a pseudo code for adjusting the local cipher counter based on the received CRC in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

Passive Optical Network Topology

Figure 1:
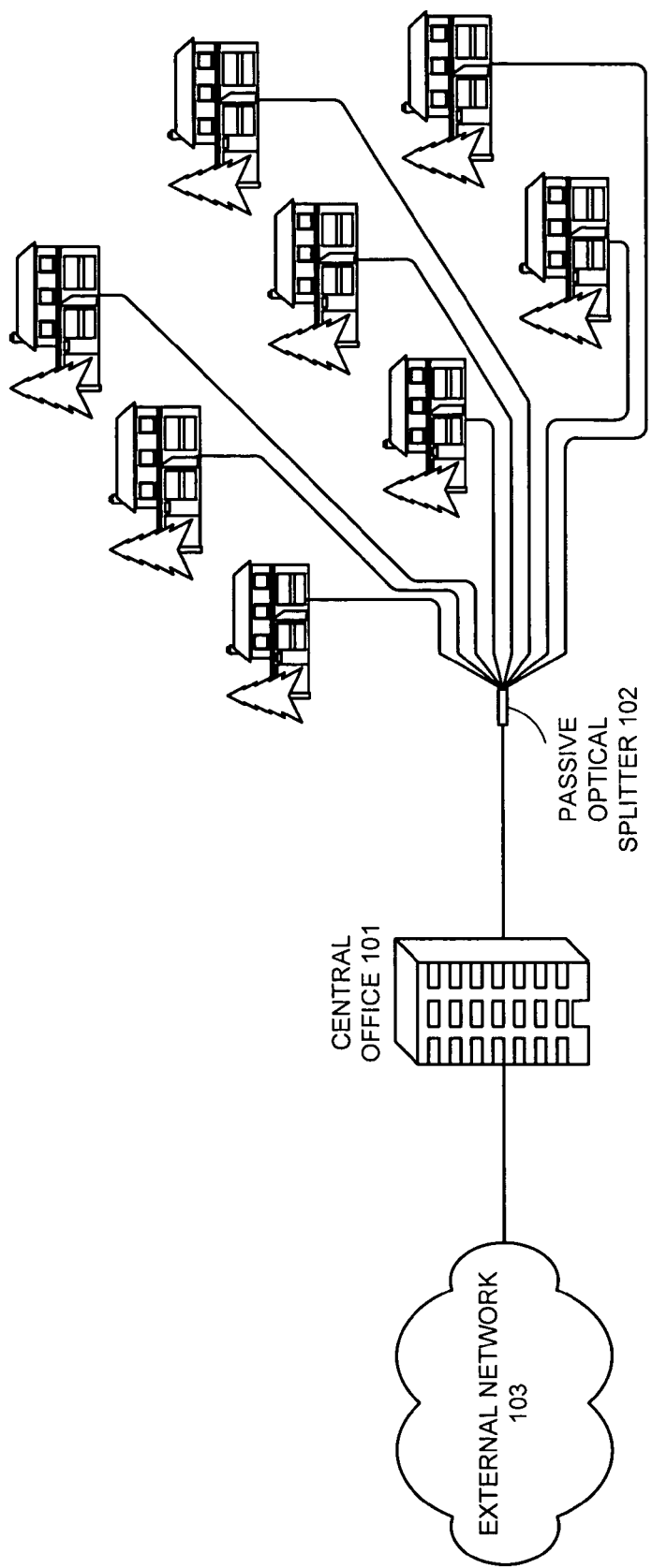
FIG. 1 illustrates an Ethernet passive optical network wherein a central office and a number of subscribers are coupled through optical fibers and a passive optical splitter.

FIG. 1 illustrates a passive optical network, wherein a central office and a number of subscribers are coupled together through optical fibers and a passive optical splitter (prior art). As shown in FIG. 1, a number of subscribers are coupled to a central office 101 through optical fibers and a passive optical splitter 102. Passive optical splitter 102 can be placed in the vicinity of end-user locations, so that the initial fiber-deployment cost is minimized. Central office 101 can be coupled to an external network 103, such as a metropolitan area network operated by an Internet service provider (ISP). Note that although FIG. 1 illustrates a tree topology, a passive optical network can also be based on other topologies, such as a ring or a bus.

Normal Operation Mode in EPON

Figure 2:
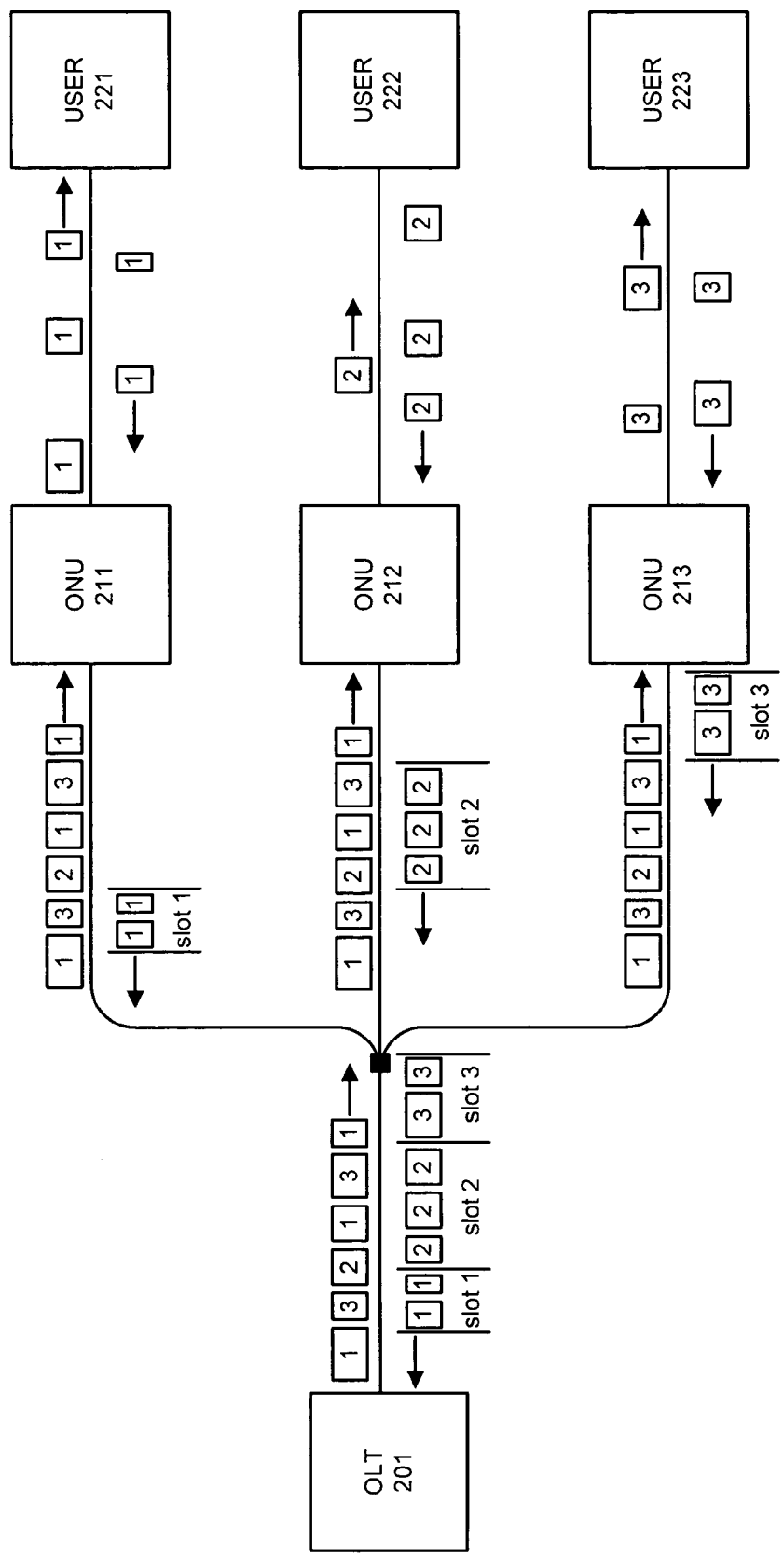
FIG. 2 illustrates the normal operation mode of an EPON.

FIG. 2 illustrates the normal operation mode of an EPON (prior art). To allow ONUs to join an EPON at arbitrary times, an EPON typically has two modes of operation: a normal operation mode and a discovery (initialization) mode. Normal operation mode involves regular downstream and upstream data transmissions, and allows an OLT to assign transmission opportunities to all initialized ONUs.

As shown in FIG. 2, in the downstream direction, OLT 201 broadcasts downstream data to ONU 211, ONU 212, and ONU 213. While all ONUs may receive the same copy of data, each ONU selectively forwards only the data destined to itself to its corresponding users, which are user 221, user 222, and user 223, respectively.

In the upstream direction, OLT 201 first schedules and assigns transmission timeslots to each ONU according to the ONU's service-level agreement. When not in its transmission timeslot, an ONU typically buffers the data received from its user. When its scheduled transmission timeslot arrives, an ONU transmits the buffered user data within the assigned transmission timeslot.

Since every ONU takes turns in transmitting upstream data according to the OLT's scheduling, the upstream link's capacity can be efficiently utilized. However, for the scheduling to function properly, the OLT needs to discover and initialize a newly joined ONU. During discovery, the OLT may collect information critical to transmission scheduling, such as the ONU's round-trip time (RTT), its media access control (MAC) address, its service-level agreement, etc. (Note that in some cases service-level agreement may already be known to the OLT).

Discovery Mode in EPON

Figure 3:
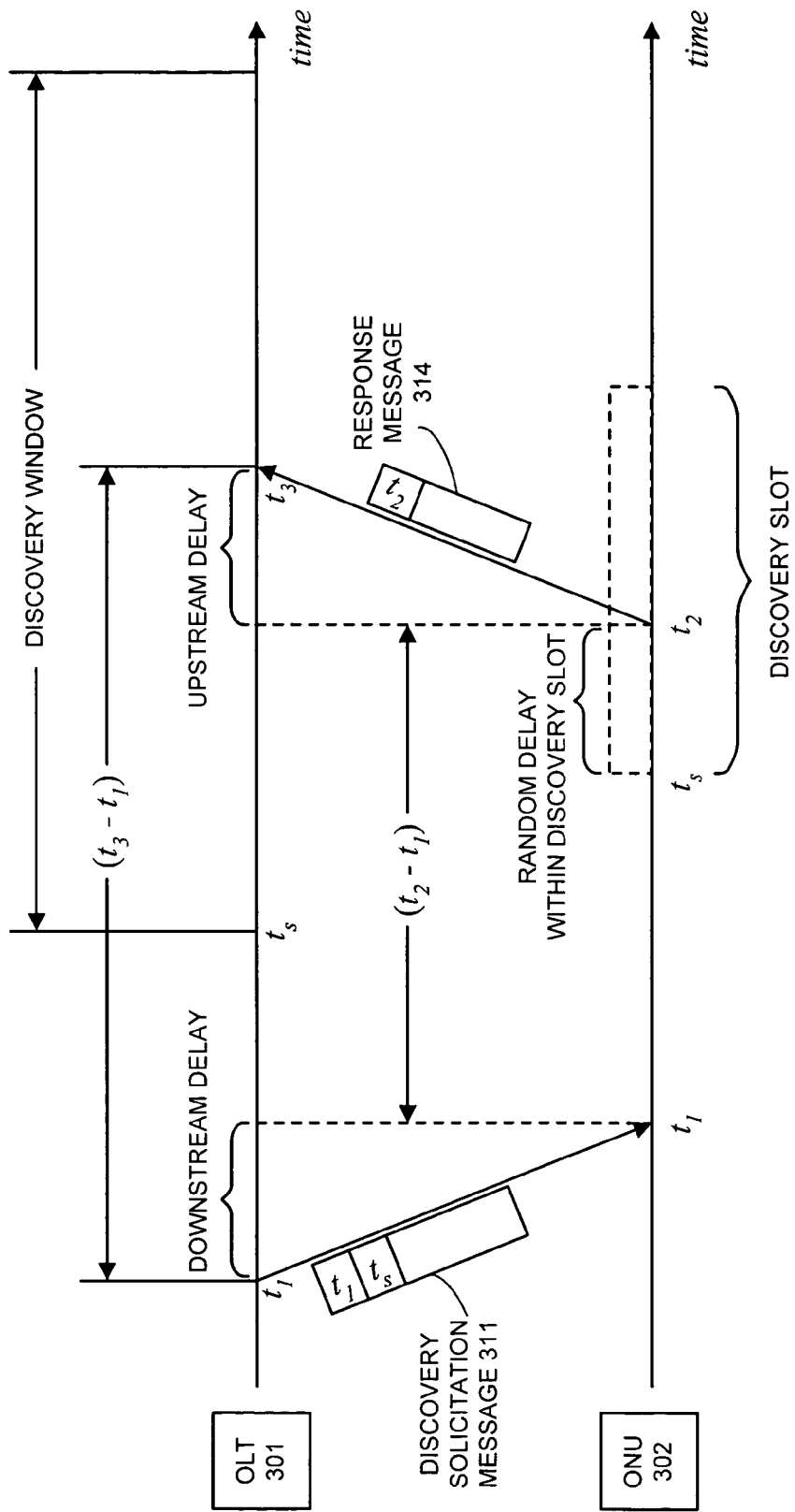
FIG. 3 presents a time-space diagram illustrating the discovery process.

FIG. 3 presents a time-space diagram illustrating the discovery process (prior art). At the beginning of the discovery process, OLT 301 first sets a start time $t_s$ of a time interval in which OLT 301 enters the discovery mode and allows new ONUs to register (this time interval is called the discovery window). Note that, from the current time until $t_s$, OLT 301 can keep receiving normal upstream data from registered ONUs. OLT 301 also sets a time interval during which each newly joined ONU is allowed to transmit a response message to OLT 301 to request registration (called the discovery slot), wherein the start time of a discovery slot is the same as the start time of the discovery window, $t_s$. Since there might be more than one ONU seeking registration, and since the distance between an unregistered ONU and OLT 301 is unknown, the size of the discovery window should at least include the size of a discovery slot and the maximum allowed round-trip delay between an ONU and OLT 301.

At a time $t_1$ ($t_1 < t_s$), OLT 301 broadcasts a discovery solicitation message 311 (which can be a discovery GATE message, in accordance to the IEEE 802.3ah multi-point control protocol (MPCP) standard) to all the ONUs, including a newly joined unregistered ONU 302. Discovery solicitation message 311 includes a time stamp of $t_1$, which is the time when the message is sent by OLT 301, and a time stamp of $t_s$, which is the start time of the discovery slot. Upon receiving discovery solicitation message 311, ONU 302 sets its local clock to $t_1$ according to the time stamp carried by discovery solicitation message 311.

When ONU 302's local clock reaches $t_s$, the start time of the discovery slot, ONU 302 waits an additional random delay and then transmits a response message 314 (which can be a REGISTER_REQUEST message, in accordance to the IEEE 802.3ah MPCP standard). This random delay is applied to avoid persistent collisions when response messages from multiple uninitialized ONUs consistently collide. Response message 314 contains ONU 302's MAC address and a timestamp of $t_2$, which is ONU 302's local time when response message 314 is sent.

When OLT 301 receives response message 314 from ONU 302 at time $t_3$, it learns ONU 302's MAC address and ONU 302's local time $t_2$ when response message 314 is sent. OLT 301 can then compute the round-trip delay of ONU 302, which is $[(t_3-t_1)-(t_2-t_1)]=(t_3-t_2)$.

EPON Data Encryption

As previously mentioned, because every data frame sent from an OLT is broadcast to all ONUs, the potential security risk associated with the EPON architecture can be high. In an EPON, eavesdropping is possible by operating an ONU in promiscuous mode, wherein the ONU listens to traffic intended to other ONUs. Although EPON's point-to-point emulation uses logic link identifiers (LLIDs) to allow different ONUs to filter frames, an ONU might disable this filtering mechanism and monitor all the traffic.

Compared with downstream traffic, the upstream traffic is relatively more secure. Typically, upstream traffic is visible only to the OLT, because of the directivity of a passive combiner. However, reflections might still occur in the passive combiner. The passive combiner may send some small fraction of the upstream signals in the downstream direction. In general, this downstream reflection does not pose a huge security threat, because an ONU's receiver is typically tuned to receive downstream transmission which is on a different wavelength than the upstream transmission. Hence, it is more difficult for an ONU to receive the reflected upstream signals from other ONUs.

Yet, the upstream traffic can still be intercepted at the optical splitter/combiner, if the optical splitter/combiner is a symmetrical device (e.g., a star coupler). In this case, any upstream traffic is reflected to a number of ports at the splitter/combiner. A special receiver sensitive to the upstream wavelength can be coupled to one of the unused ports at the splitter/combiner to intercept all upstream traffic.

To reduce the aforementioned security risks, it is desirable to perform data encryption within an EPON. In particular, encryption of downstream transmission prevents eavesdropping when the encryption key is not shared. Downstream encryption can provide privacy to subscriber data and can make impersonation of another ONU difficult. Additionally, upstream encryption prevents interception of upstream traffic when a tap is added to the EPON splitter/combiner. Upstream encryption can also prevent impersonation, because an ONU generating an upstream frame is expected to possess a key presumably known only to that ONU.

Encryption Mechanism

One approach to facilitate data encryption in an EPON is based on the Advanced Encryption Standard (AES), which allows one to use 128-bit, 192-bit, or 256-bit keys. One embodiment of the present invention provides an encryption mechanism which is suitable for an EPON. This encryption mechanism does not modify the Ethernet frame format, including the preamble and the inter-packet gap (IPG). Therefore, the Ethernet frame in an EPON adopting such encryption mechanisms can remain complaint with the IEEE standards and avoid potential interferences with future extension of the IEEE 802.3 standard (relating to Ehternet).

One embodiment of the present invention is in accordance with a variation of the Block Cipher Mode encryption, namely the Counter mode (CTR), as defined by the National Institute of Standards and Technology (NIST). FIG. 4A illustrates an encryption scheme for EPON data frames in accordance with an embodiment of the present invention. In this example, the incoming plain text (i.e., unencrypted data) is divided into 128-bit blocks and each block is encrypted individually. During operation, an encrypter 402 performs an encryption function on a 128-bit input block $U_i$ and a session key K based on AES standards. The encryption function then produces a 128-bit output block $V_i = E(U_i, K)$. The output block $V_i$ is subsequently exclusively ORed (XORed, represented by the ⊕ sign) with a 128-bit block of plain text, $P_i$, to produce a 128-bit block of cipher text $C_i$.

Note that in FIG. 4A, the system generates a different input block $U_i$ for each plain text block $P_i$. The key K, on the other hand, does not expire until the end of a session. Furthermore, since a message does not necessarily carry an integer number of 128-bit blocks, the last plain text block (1 to 16 bytes in length) within a data frame is XORed with the most significant portion of the last output block. This approach does not require padding of the plain-text messages and provides an encryption function without overhead. The following representations describe the CTR block cipher mode:

$$V_i = E(K, U_i) \text{ for } i=1, \ldots, k \quad (1)$$

$$C_i = P_i \oplus V_i \quad (2)$$

where $P_i$ is the ith plain-text block, $C_i$ is the ith cipher-text block, K is the session key, $V_i$ is the ith cipher output block, and $U_i$ is a series of input 128-bit values which are used only once during the lifetime of the given session key.

Figure 4B:
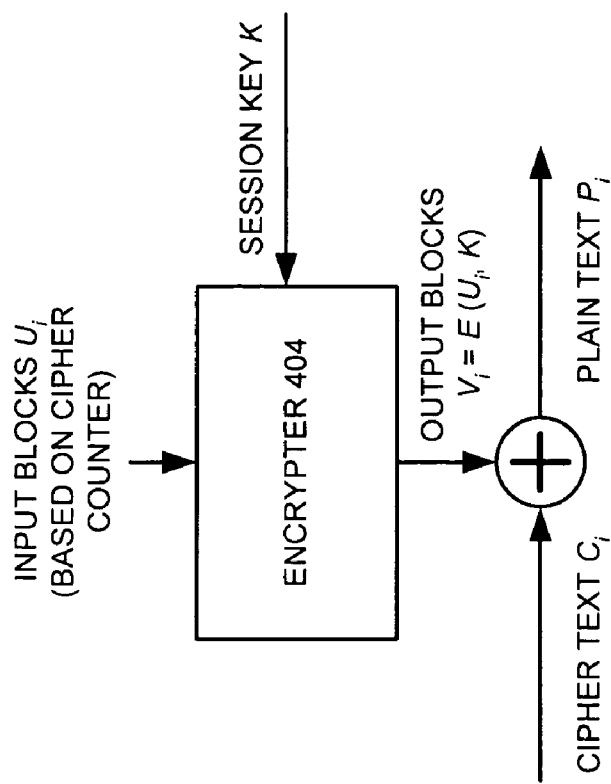
FIG. 4B illustrates a decryption scheme for EPON data frames in accordance with an embodiment of the present invention.
Figure 4A:
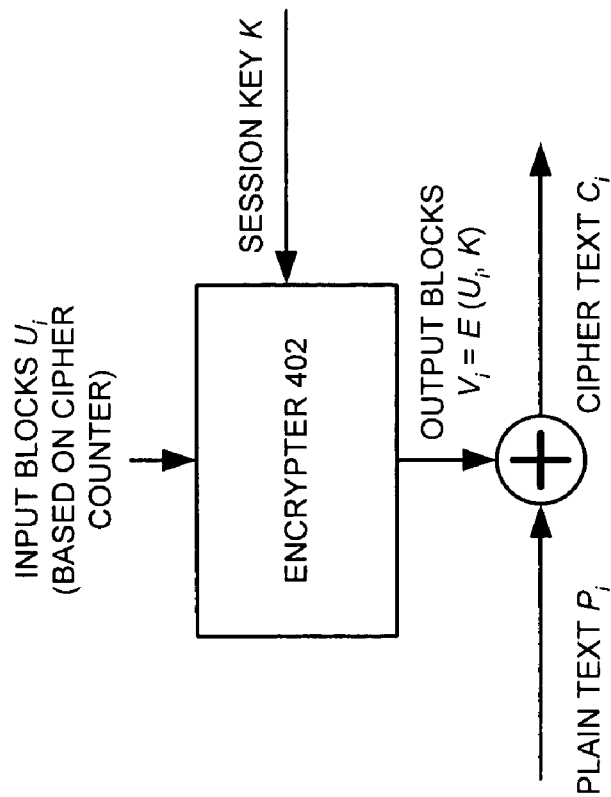
FIG. 4A illustrates an encryption scheme for EPON data frames in accordance with an embodiment of the present invention.

FIG. 4B illustrates a decryption scheme for EPON data frames in accordance with an embodiment of the present invention. To decrypt a message, the incoming cipher text (i.e., the encrypted data) is divided into 128-bit blocks and each block is decrypted individually. During operation, an encrypter 404 performs an encryption function on a 128-bit input block $U_i$ and a session key K. The encryption function then produces a 128-bit output block $V_i = E(U_i, K)$. The output block $V_i$ is subsequently XORed with a 128-bit block of cipher text $C_i$ to produce a 128-bit block of plain text $P_i$. Note that to correctly decrypt the cipher text, the receiving/decrypting side ideally uses the same cipher counter sequence at the transmitting/encrypting side.

In the CTR encryption scheme, a non-repeating cipher input block value is associated with each 128-bit block of text. These cipher input block values are constructed based on a 48-bit counter, namely cipher counter, and a 7-bit counter called block counter.

Figure 5:
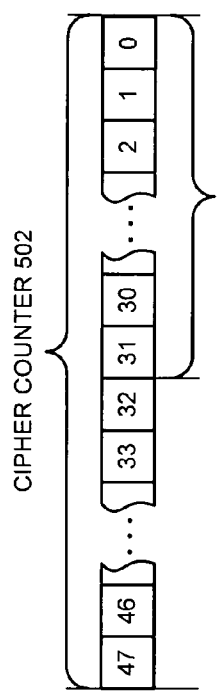
FIG. 5 illustrates the composition of a 48-bit cipher counter in accordance with an embodiment of the present invention.

FIG. 5 illustrates the composition of a 48-bit cipher counter in accordance with an embodiment of the present invention. The 32 least-significant bits (bit 0 to bit 31) of a cipher counter 502 are identical to a multi-point control protocol (MPCP) counter 504, which is defined in the IEEE 802.3ah standard. Cipher counter 502 is incremented every 16 ns.

A 7-bit block counter (not shown in FIG. 5) is responsible for counting the number of 128-bit blocks within a data frame. The block counter is reset to zero at the beginning of each frame and is incremented by 1 for each 128-bit block.

Figure 6:
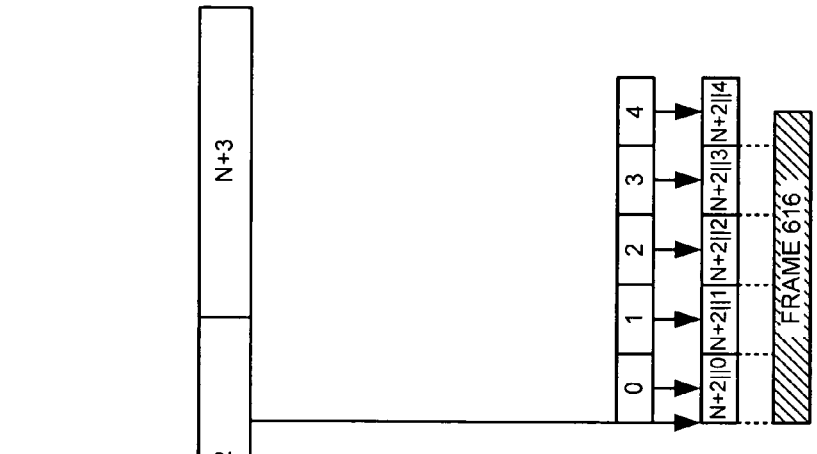
FIG. 6 illustrates the relationship between a cipher counter sequence, a block counter sequence, and cipher input block values in accordance with one embodiment of the present invention.
Figure 6:
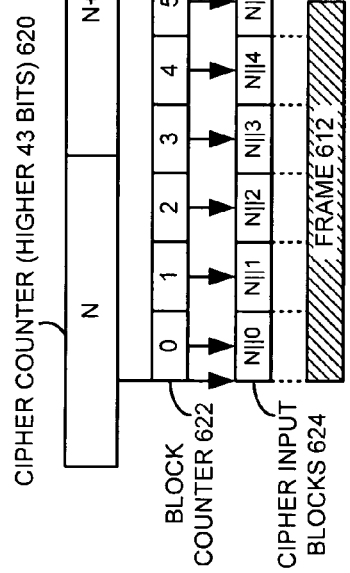

FIG. 6 illustrates the relationship between a cipher counter sequence, a block counter sequence, and cipher input block values in accordance with one embodiment of the present invention. During operation, the 48-bit cipher counter is truncated and 5 of its least significant bits are not used (the reason for doing so is explained below). The remaining 43 most significant bits of cipher counter 620 are concatenated with the 7-bit block counter 622 to produce a 50-bit value. Note that the truncated 43-bit cipher counter is incremented every 512 ns ($16 \times 2^5 = 512$ ns). Ideally, this 50-bit value continues to increment without repeating itself within the lifetime of the session key. Each cipher input block is constructed by duplicating and concatenating the 50-bit values to fill a 128-bit space. The resulting cipher input blocks correspond to each 128-bit block of data.

As shown in FIG. 6, the beginning of frame 612 coincides with the truncated 43-bit cipher counter whose value at that moment is N. Consequently, each 128-bit block of frame 612 is associated with a cipher input block which is constructed by concatenating the 43-bit cipher counter with the value of block counter 622 (represented as N||0, N||1, . . . ). Note that the value of the 43-bit cipher counter associated with frame 612 does not change, even if frame 612 is sufficiently long for the 43-bit cipher counter to be incremented to N+1.

Subsequent to frame 612, frame 614 is associated with a 43-bit cipher counter value of N+1, and each of its 128-bit block is associated with cipher input blocks represented as (N+1)||0, (N+1)||1, . . . . Similarly, frame 616 is associated with a 43-bit cipher counter value of N+2, and its 128-bit block is associated with cipher input blocks represented as (N+2)||0, (N+2)||1.

Cipher Counter Alignment

Figure 7:
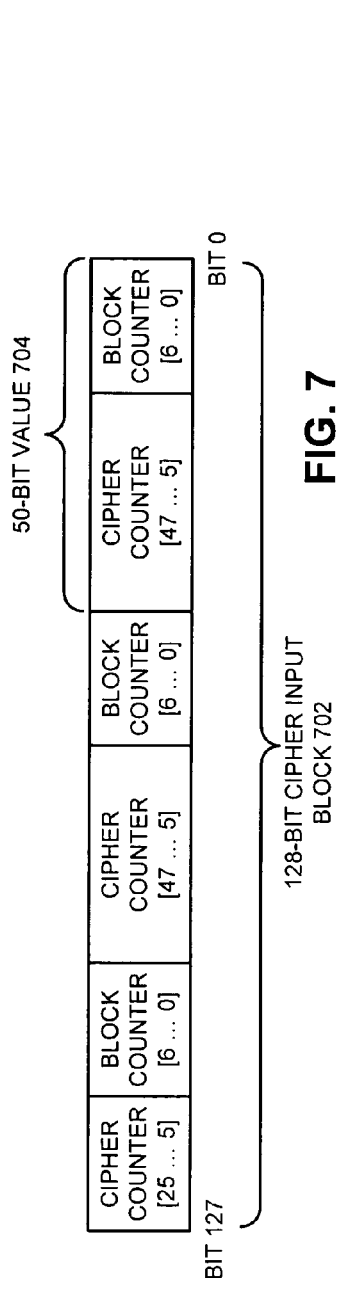
FIG. 7 illustrates the composition of a 128-bit input block in accordance with one embodiment of the present invention.

FIG. 7 illustrates the composition of a 128-bit input block in accordance with one embodiment of the present invention. A 128-bit cipher input block 802 is constructed by duplicating and concatenating a 50-bit value 804 three times, and discarding the most-significant 22 bits of the resulting 150-bit value. The 50-bit value is obtained by concatenating the 43 most significant bits of a 48-bit cipher counter with a 7-bit block counter.

For proper operation of the counter-mode encryption scheme, it is critical that the cipher input block values and cipher counters are aligned with respect to the data frames being encrypted or decrypted. If the propagation delay between the OLT and an ONU remains constant, the OLT's MPCP counter and the ONU's MPCP counter remain aligned. That is, if a frame is transmitted by the OLT when its MPCP counter reaches N, this frame will be received by the ONU when the ONU's local MPCP counter also reaches N. The alignment of MPCP counters ensures the alignment of cipher counters.

However, the IEEE 802.3ah standard allows a data frame to experience a 16 ns delay while passing through a medium access control (MAC) sub-layer, and an additional 16 ns delay while pass through a physical (PHY) layer. These delay variations may accumulate in the transmitting or receiving station. Specifically, the IEEE 802.3ah standard allows the accumulated delay variation of no more than 128 ns in the downstream (OLT to ONU) direction and no more than 192 ns for a round-trip (OLT to ONU to OLT) transmission.

To keep the cipher input block values synchronized with respect to the user data, only the 43 most-significant bits of the 48-bit cipher counter are considered for creating the input block values. In this way, the 43-bit truncated cipher counter is updated only every 512 ns. However, it is still possible that the 43 most significant bits of the cipher counters in the transmitting and receiving stations become misaligned. For example, a carry-over from bit 4 to bit 5 may occur in the 48-bit cipher counter at the receiving station because of the propagation delay variation. As a result, the 43-bit truncated cipher counters of the transmitting and receiving stations can become misaligned. To ensure that the cipher counters are properly aligned, one embodiment of the present invention allows the value of bit 5 of the 48-bit cipher counter at the transmitting station to be recorded within the corresponding data frame.

One embodiment of the present invention retains the value of bit 5 of the 48-bit cipher counter at a transmitting station by inverting the bits of the 8-bit cyclic redundancy checksum (CRC-8) which is located in the preamble of the data frame. In this way, one can avoid using reserved bits in the preamble and therefore remain in compliance with future extensions of the IEEE standards. Consequently, potential interferences with future extension of the 802.3 standard in the EPON context can be minimized. Table 1 illustrates a pseudo code for inverting a CRC for the data frame to reflect the value of bit 5 of the cipher counter in accordance with an embodiment of the present invention.

TABLE 1

```
if ( cipher_counter[5] == 1)
    preamble[56:63] = CRC8;
else
    preamble[56:63] = ~CRC8;
```

In Table 1, cipher_counter[5] denotes bit 5 of the cipher counter, preamble [56:63] denotes bits 56 to 63 of the data frame preamble which is typically used to store the CRC, CRC8 denotes an 8-bit CRC, and ~CRC8 denotes the inversion of the 8-bit CRC.

Table 2 illustrates a pseudo code for recovering the value of bit 5 of the cipher counter by comparing the received CRC with a calculated CRC for the data frame in accordance with an embodiment of the present invention. In Table 2, cipher_bit 5 denotes the recovered value of bit5 of the cipher counter.

TABLE 2

```
if( preamble[56:63] == CRC8)
    cipher_bit5 = 1
else if( preamble[56:63] == ~CRC8)
    cipher_bit5 = 0
else
    // Preamble is invalid - discard the frame
```

A receiving station ideally notes the value of its local cipher counter corresponding to the first byte of a received data frame. After bit 5 of the cipher counter is recovered based on the CRC for the data frame, the local cipher counter can be reliably adjusted. This can be done by incrementing or decrementing the cipher counter value until bit 5 of the counter is equal to the recovered value thereof. The decision as to whether to increment or decrement the counter is based on which direction will result in a smaller absolute change. Since the maximum delay variation allowed by the IEEE 802.3ah standard is less than half of the update period for bit 5, only one direction for adjustment is possible.

Table 3 illustrates a pseudo code for adjusting the local cipher counter based on the received CRC in accordance with an embodiment of the present invention. Here cipher_bit5 denotes the recovered value for bit 5 of the cipher counter, and cipher_counter[0:4] denotes the 5 least significant bits of the cipher counter. When the recovered value of bit 5 is different from the actual value, and if the value of the lower 5 bits of the cipher counter is greater than or equal to $2^4$ (half of the maximum value represented by 5 binary digits), the cipher counter is incremented until its bit 5 changes. This can be done by, for example, adding to the cipher counter an inversion of its lower 5 bits, and then adding 1 to it. This ensures that a carry-over from bit 4 to bit 5 occurs.

Similarly, if the value of the lower 5 bits of the cipher counter is less than $2^4$, the cipher counter is decremented until its bit 5 changes. This can be done by subtracting from the cipher counter the value of its lower 4 bits, and then further subtracting 1 from it.

It should be noted that ideally the value of the cipher counter does not repeat during the lifetime of a session key. The cipher counter runs synchronously with MPCP counter and wraps around after $2^{48}$ increments, which corresponds to approximately 1250 hours or 52 days.

TABLE 3

```
if( cipher_counter[5] != cipher_bit5 )
{
    if( cipher_counter[0:4] >= 16 )
        // increment the cipher_counter to the nearest
        // future value so that
        // cipher_counter[5] == cipher_bit5
        cipher_counter = cipher_counter +
        ~cipher_counter[0:4] + 1;
    else
        // decrement the cipher_counter to the nearest
        // past value so that
```

TABLE 3-continued

```
        // cipher_counter[5] == cipher_bit5
        cipher_counter = cipher_counter -
        cipher_counter[0:4] - 1;
}
```

Downstream Encryption

In one embodiment of the present invention, an OLT needs only one cipher counter for encrypting downstream frames. The initial value of the OLT's cipher counter is conveyed to an ONU during the initial key exchange procedure (described below).

One advantage of the encryption scheme provided herein is that it does not result in undesirable frame chaining. Frame chaining occurs when a lost or corrupted frame can inhibit proper decryption of all subsequent frames. Based on an embodiment of the present invention, each frame is independently encrypted and decrypted based on the time of frame's departure and arrival. The departure and arrival times correspond to the time of transmission of the first octet of the frame (first octet of the destination address field).

For unicast logical links, the key exchange request can be initiated by the OLT and a new key is generated by the ONU. In case of multicast logical links, the OLT initiates key exchange and generates the new key value.

Optional Upstream Encryption

In the upstream direction, the cipher counters are not aligned as they are in the downstream direction. To encrypt upstream frames, an ONU uses the value of its cipher counter corresponding to the starting time for its granted transmission slot assigned by the OLT. The first block of the first frame in a slot would be associated with the cipher counter value corresponding to the starting time of the slot. Starting at the time when the first byte of the first frame is transmitted, the cipher counter will continue to increment itself every 16 ns.

Figure 8:
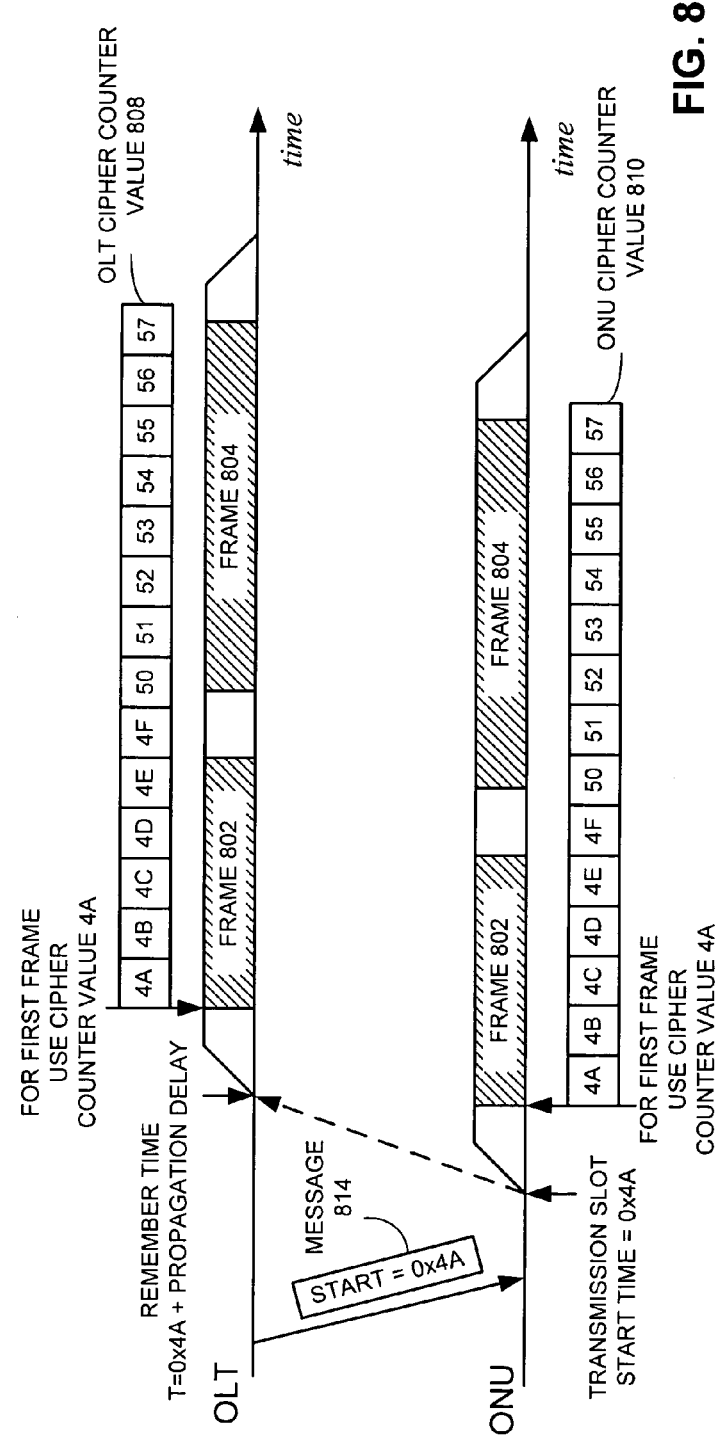
FIG. 8 illustrates the process of aligning an ONU-side cipher counter with an OLT-side cipher counter for upstream encryption in accordance with one embodiment of the present invention.

To decrypt the received frames, the OLT ideally remembers the future time when the granted transmission slot will commence for the ONU. The first frame arriving after this time will be decrypted with the cipher counter value associated with the remembered future time FIG. 8 illustrates the process of aligning an ONU-side cipher counter with an OLT-side cipher counter for upstream encryption in accordance with one embodiment of the present invention. During operation, an OLT sends a grant message 814 to an ONU. Message 814 assigns the ONU an upstream transmission slot, whose starting time is 0×4A (hexadecimal value). Because the ONU's clock is synchronized to the OLT's clock, the receiving time of message 814 at the ONU is ideally the same as the transmitting time at the OLT.

At local time 0×4A, the ONU starts transmitting the first frame 802 within the assigned transmission slot. Before transmitting frame 802, the ONU properly sets its cipher counter 810 based on the granted starting time, which is 4A. Correspondingly, the beginning value of cipher counter 802 associated with the first 128-bit block of frame 812 is set to 4A. On the OLT side, the OLT expects to receive frame 802 at time T, where T is the starting time 0×4A plus the round-trip delay from the ONU to the OLT. (The OLT keeps record of each ONU's round-trip delay.) The OLT then sets its cipher counter 808 to 4A at time T. In this way, the OLT's cipher counter can be synchronized with that of the ONU.

Similarly, the cipher counters on both the OLT and the ONU can remain synchronized for frame 804.

The actual procedure for the upstream encryption function is similar to that of the downstream encryption. For unicast logical links, a key exchange request is initiated by the OLT and a new key is generated by an ONU. In case of multicast logical links, the OLT initiates key exchange and generates the new key value.

Key Exchange Mechanism

Key exchange messages can be carried in operation, administration and management (OA&M) frames. FIG. 9 illustrates an exemplary format of a key exchange message in accordance with one embodiment of the present invention. The fields of a key exchange message are explained below:

DA—Destination MAC address as defined in the IEEE 802.3 standard, clause 3.2.4.

SA—Source MAC address as defined in the IEEE 802.3 standard, clause 3.2.5.

Length/type—This field identifies length or type of a frame as defined in the IEEE 802.3 standard, clause 3.2.6. According to the IEEE 802.3ah standard, OAM messages are identified by Slow Protocol type (88-09).

Subtype—This field identifies the specific Slow Protocol being encapsulated. OAM protocol data units (OAMPDUs) carry the Subtype value 0'03 as defined in the IEEE 802.3ah standard.

flags—This field contains status bits as defined in the IEEE 802.3ah standard clause 57.4.2.1.

code—This field identifies the specific OAMPDU. For vendor-specific OAMPDUs this field should be assigned value 0×FE as defined in the IEEE 802.3ah standard clause 57.4.2.2.

OUI—The first three octets of the Organization Specific OAMPDU Data field shall contain the Organizationally Unique Identifier (OUI). Implementations compliant with this specification ideally uses a locally administered OUI=FF-FF-FF. Note that the fields described above are also specified in the IEEE 802.3ah standards.

message_type—This field identifies a specific kind of message under the same OUI group. The format of the PDU following the message type field is dependent on the message type. message_type specifies three types of key exchange messages:

0×01 (KEY_REQUEST): This message is issued by the OLT to request a new key from an ONU. It also conveys to the ONU a future frame counter value at which a key switch-over may take place. (Note that a key switch-over is the event when an OLT or ONU changes its session key.)

0×02 (KEY_ASSIGN): This message is issued by the OLT to assign a new key to an ONU. It also conveys a future frame counter value at which a key switch-over should take place. Typically, an ONU generates a new key on OLT's request. However, in some circumstances, the OLT may generate a key. One such example is a key exchange for multicast channels, wherein all receiving devices use the same key. Note that if a multicast-capable OAM extension exists, a single copy of this message may be sent to each ONU; otherwise, an individual message is sent to each ONU.

0×03 (KEY_RESPONSE): This message is issued by an ONU in response to KEY_REQUEST or KEY_ASSIGN message. In this message, an ONU conveys to the OLT the new key value to be used after the switch-over and also confirms the key switch-over counter value.

options—This field list special requirements of key exchange. If bit 0 of this field is 0, it indicates a downstream key exchange. If bit 0 of this field is 1, it indicates an upstream key exchange. Bits 1 to 15 are reserved.

cipher_counter—This field contains 16 most significant bits of cipher counter corresponding to the first block of the key exchange message. Although a cipher counter is 48-bit long, the actual transmitted cipher counter from a transmitting station to a receiving station does not need to contain all 48 bits. This is because the lower 32 bits are identical to an MPCP counter, which is typically synchronized between the transmitting station and the receiving station. A full-length, 48-bit cipher counter is updated every 16 ns. By contrast, the higher 16-bit portion of the cipher counter is updated much less frequently. Therefore, transmitting only the higher 16 bits can significantly reduce the burden on the control mechanism.

switch_counter—This field represents the value of the cipher counter at which a given key should become active. It is important that the new key becomes active in the OLT and an ONU synchronously with transmission and reception of the same message.

key—This field carries a 128-bit value representing the encryption key.

pad—Additional redundant bits to pad up the frame.

FCS—This is the Frame Check Sequence.

In a downstream key exchange, the OLT initiates the key exchange procedure by generating a KEY_REQUEST message. The switch_counter field carries the frame number corresponding to the first frame to use the new key value. The value of cipher_counter is set to the 16 most significant bits of the OLT's own cipher counter corresponding to the first block of the KEY_REQUEST message. The options field has its bit 0 set to 0. Simultaneously with sending the KEY_REQUEST message, the OLT starts a key exchange timer.

Upon receiving the KEY_REQUEST message, the ONU loads its cipher counter with a combination of the received 16 most significant bits of OLT's cipher counter, and its local MPCP counter. The ONU then stores the received switch_counter value. Next, it generates and stores a new key and responds to the OLT by transmitting a KEY_RESPONSE message in which it conveys the new key to the OLT. The switch_counter field of the KEY_RESPONSE message carries a copy of the received switch_counter value. The key field contains a new 128-bit value to be used as a new key. The cipher_counter field is set to the 16 most significant bits of the ONU's own cipher counter corresponding to the first block of the KEY_RESPONSE message. The options field has its bit 0 set to value 0 and bit 1 set to value 1.

A successful receiption of the KEY_RESPONSE message concludes the key exchange procedure. If no KEY_RESPONSE message arrives before the key exchange timer expires, or if the returned value of switch_counter does not correspond to the value set in the KEY_REQUEST message, the OLT will initiate another key exchange procedure by issuing a new KEY_REQUEST message. When a new KEY_REQUEST message arrives, the ONU may discard any stored keys it may have generated previously and generate a new key. Ideally, the ONU uses the most-recently received switch_counter value and the most-recently generated key. Furthermore, the OLT may initiate a key exchange procedure well in advance of the intended key switch-over time. This ensures that the key exchange can be repeated several times.

An upstream key exchange procedure is similar to a downstream key exchange procedure, with the exception that bit 0 of the opt ion field has value of 1 in both KEY_REQUEST and KEY_RESPONSE messages. If upstream encryption is desired, the initial key exchange procedure for the upstream channel is ideally performed before the key exchange for the downstream channel.

Maintaining States of Cipher Counters for Multiple ONUs

One way for an OLT to keep track of the states of cipher counters for the ONUs is to implement a separate cipher counter for each ONU. However, this approach requires a large number of gates. A chip's limited die area would affect the scalability of an EPON implementing this approach. Furthermore, each cipher counter needs to be reset at the start of an encryption session and when an encryption key is changed. Another challenge associated with this approach is that when the MPCP counter rolls over, each cipher counter needs to be updated simultaneously. Therefore, synchronization of all the cipher counters within the OLT is difficult to control.

One embodiment of the present invention alleviates the aforementioned problems by implementing only one counter, namely a cycle counter. To track the states of cipher counters corresponding to different ONUs, the OLT provides a number of registers for each ONU. By using these registers, the OLT can keep track of the offset between each ONU's cipher counter and the cycle counter which is continuously updated. In this way, the OLT can avoid updating many cipher counters independently.

In one embodiment, the OLT provides a register for each ONU (or each LLID). Whenever a cipher counter is reset, the OLT writes the value of the current cycle counter into the register. During an encryption process, the value of a given ONU's cipher counter is re-created by subtracting the value of the corresponding register from the current value of the cycle counter. In this way, the OLT only needs to increment a single counter when the MPCP counter rolls over. Consequently, the complexity of the hardware implementation can be significantly reduced. Note that the register does not need to be incremented continuously. Instead, it is updated only when the corresponding cipher counter needs to be reset.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for decrypting downstream data in an Ethernet passive optical network (EPON), comprising:

receiving a data frame which is encrypted based on a remote input block and a session key, wherein the remote input block is constructed based on a remote cipher counter and a remote block counter;

adjusting a local cipher counter based on a received checksum located in a preamble of the data frame, wherein the local cipher counter is synchronized with the remote cipher counter;

truncating the local cipher counter by discarding n least significant bits thereof, wherein n is equal to 5, wherein the untruncated local cipher counter is more than 5 bits long, and wherein a portion of the untruncated local cipher counter is identical to a local multi-point control protocol (MPCP) counter;

constructing a local input block based on the truncated cipher counter and a local block counter for the received data frame; and decrypting the data frame based on the local input block and the session key.

2. The method of claim 1, wherein the checksum is a cyclic redundancy checksum (CRC); and wherein adjusting the local cipher counter involves:

computing a cyclic redundancy checksum (CRC) for the received data frame;

comparing the computed CRC with the received CRC attached to the received data frame;

if the computed CRC is equal to the received CRC, setting an expected value of the (n−1)th bit of the local cipher counter to "1;" and if the computed CRC is the inversion of the received CRC, setting the expected value of the (n−1)th bit of the local cipher counter to "0."

3. The method of claim 2, wherein if the (n−1)th bit of the local cipher counter is not equal to the expected value thereof, and if the decimal value of the least significant n bits of the untruncated local cipher counter is greater than or equal to $2^{(n-1)}$, adjusting the local cipher counter involves incrementing the (n+1)th bit of the local cipher counter by one and performing necessary carry-overs; and wherein if the (n−1)th bit of the local cipher counter is not equal to the expected value thereof, and if the decimal value of the least significant n bits of the untruncated local cipher counter is less than $2^{(n-1)}$, adjusting the local cipher counter involves decrementing the (n+1)th bit of the local cipher counter by one and performing necessary carry-overs.

4. The method of claim 1, wherein the untruncated local cipher counter is 48-bit long;

the least significant 32 bits of the untruncated local cipher counter is identical to the local MPCP counter;

wherein the method further comprises incrementing the 48-bit long untruncated local cipher counter every 16 ns; and wherein constructing the local input block involves:
concatenating the truncated local cipher counter with a block counter to obtain a 50-bit value, wherein the block counter is 7-bit long and is reset to zero for every data frame; and
duplicating the 50-bit value to fill a 128-bit space for the local input block starting from the least significant bit.

5. The method of claim 4, wherein decrypting the received data frame involves:

encrypting the local input block with the session key based on the Advanced Encryption Standard (AES) to obtain a local output block; and performing an exclusive OR (XOR) operation on a 128-bit block within the received data frame and the local output block to obtain a 128-bit block of unencrypted data, wherein the 128-bit block corresponds to the block counter.

6. The method of claim 4, further comprising:

receiving the 16 most significant bits of the remote cipher counter which is 48-bit long; and concatenating the local MPCP counter with the received 16 bits to obtain the 48-bit local cipher counter, thereby synchronizing the local cipher counter with the remote cipher counter.

7. A method for encrypting downstream data from an OLT to an ONU in an EPON, comprising:

receiving an unencrypted data frame;

modifying a checksum located in a preamble of the data frame based on a cipher counter, wherein n is equal to 5, truncating the cipher counter by discarding n least significant bits thereof, wherein the untruncated local cipher counter is more than 5 bits long, and wherein a portion of the untruncated local cipher counter is identical to a local multi-point control protocol (MPCP) counter;

constructing an input block based on the truncated cipher counter and a block counter for the data frame; and encrypting the data frame based on the input block and a session key.

8. The method of claim 7, wherein modifying the checksum for the data frame involves:

setting the checksum to be a CRC for the data frame if the (n+1)th bit of the cipher counter is equal to "1;" and setting the checksum to be the inversion of the CRC for the data frame if the (n+1)th bit of the cipher counter is equal to "0."

9. The method of claim 7, wherein the untrucated cipher counter is 48-bit long;

the lower 32 bits of the untruncated cipher counter is identical to the local MPCP counter;

wherein the method further comprises incrementing the 48-bit long untruncated cipher counter every 16 ns; and wherein constructing the input block involves:

concatenating the truncated cipher counter with a block counter to obtain a 50-bit value, wherein the block counter is 7-bit long and reset to zero for every data frame; and duplicating the 50-bit value to fill a 128-bit space for the input block starting from the least significant bit.

10. The method of claim 9, wherein encrypting the data frame involves:

encrypting the input block with the session key based on AES to obtain an output block; and performing an exclusive OR (XOR) operation on a 128-bit block within the data frame and the output block to obtain a 128-bit block of encrypted data for the data frame, wherein the 128-bit block corresponds to the block counter.

11. The method of claim 9, further comprising sending the 16 most significant bits of the cipher counter to a optical network unit (ONU), so that the ONU's cipher counter can be synchronized.

12. The method of claim 9, wherein incrementing the 48-bit long untruncated cipher counter involves:

incrementing the MPCP counter every 16 ns;

maintaining a 16-bit cycle counter which is incremented when the MPCP counter rolls over;

maintaining a register for the ONU which contains the value of the cycle counter when an encryption key associated with the ONU is last changed;

obtaining a 16-bit value by subtracting the value in the register from the value of the cycle counter; and obtaining the 48-bit long cipher counter by concatenating the 16-bit value with the MPCP counter.

13. A computer-readable storage medium storing instructions that when executed by a computer cause the computer to perform a method for decrypting downstream data in an Ethernet passive optical network (EPON), the method comprising:
receiving a data frame which is encrypted based on a remote input block and a session key, wherein the remote input block is constructed based on a remote cipher counter and a remote block counter;
adjusting a local cipher counter based on a received checksum located in a preamble of the data frame, wherein the local cipher counter is synchronized with the remote cipher counter;
truncating the local cipher counter by discarding n least significant bits thereof, wherein n is equal to 5, wherein the untruncated local cipher counter is more than 5 bits long, and wherein a portion of the untruncated local cipher counter is identical to a local multi-point control protocol (MPCP) counter;
constructing a local input block based on the truncated cipher counter and a local block counter for the received data frame; and
decrypting the data frame based on the local input block and the session key.

14. The computer-readable storage medium of claim 13, wherein the checksum is a CRC; and
wherein adjusting the local cipher counter involves:
computing a cyclic redundancy checksum (CRC) for the received data frame;
comparing the computed CRC with the received CRC attached to the received data frame;
if the computed CRC is equal to the received CRC, setting an expected value of the (n−1)th bit of the local cipher counter to "1;" and
if the computed CRC is the inversion of the received CRC, setting the expected value of the (n−1)th bit of the local cipher counter to "0."

15. The computer-readable storage medium of claim 14,
wherein if the (n−1)th bit of the local cipher counter is not equal to the expected value thereof, and
if the decimal value of the least significant n bits of the untruncated local cipher counter is greater than or equal to $2^{(n-1)}$,
adjusting the local cipher counter involves incrementing the (n+1)th bit of the local cipher counter by one and performing necessary carry-overs; and
wherein if the (n−1)th bit of the local cipher counter is not equal to the expected value thereof, and
if the decimal value of the least significant n bits of the untruncated local cipher counter is less than $2^{(n-1)}$,
adjusting the local cipher counter involves decrementing the (n+1)th bit of the local cipher counter by one and performing necessary carry-overs.

16. The computer-readable storage medium of claim 13,
wherein the untruncated local cipher counter is 48-bit long;
the least significant 32 bits of the untruncated local cipher counter is identical to a the local MPCP counter;
wherein the method further comprises incrementing the 48-bit long untruncated local cipher counter every 16 ns; and
wherein constructing the local input block involves:
concatenating the truncated local cipher counter with a block counter to obtain a 50-bit value, wherein the block counter is 7-bit long and is reset to zero for every data frame; and
duplicating the 50-bit value to fill a 128-bit space for the local input block starting from the least significant bit.

17. The computer-readable storage medium of claim 16, wherein decrypting the received data frame involves:
encrypting the local input block with the session key based on the Advanced Encryption Standard (AES) to obtain a local output block; and
performing an exclusive OR (XOR) operation on a 128-bit block within the received data frame and the local output block to obtain a 128-bit block of unencrypted data, wherein the 128-bit block corresponds to the block counter.

18. The computer-readable storage medium of claim 16, wherein the method further comprises:
receiving the 16 most significant bits of the remote cipher counter which is 48-bit long; and
concatenating the local MPCP counter with the received 16 bits to obtain the 48-bit local cipher counter, thereby synchronizing the local cipher counter with the remote cipher counter.

19. A computer-readable storage medium storing instructions that when executed by a computer cause the computer to perform a method for encrypting downstream data in an EPON, the method comprising:
receiving an unencrypted data frame;
modifying a checksum located in a preamble of the data frame based on a cipher counter;
truncating the cipher counter by discarding n least significant bits thereof, wherein n is equal to 5, wherein the untruncated local cipher counter is more than 5 bits long, and wherein a portion of the untruncated local cipher counter is identical to a local multi-point control protocol (MPCP) counter;
constructing an input block based on the truncated cipher counter and a block counter for the data frame; and
encrypting the data frame based on the input block and a session key.

20. The computer-readable storage medium of claim 19, wherein modifying the checksum for the data frame involves:
setting the checksum to be a CRC for the data frame if the (n+1)th bit of the cipher counter is equal to "1;" and
setting the checksum to be the inversion of the CRC for the data frame if the (n+1)th bit of the cipher counter is equal to "0."

21. The computer-readable storage medium of claim 19, wherein the untrucated cipher counter is 48-bit long;
the lower 32 bits of the untruncated cipher counter is identical to the local MPCP counter;
wherein the method further comprises incrementing the 48-bit long untruncated cipher counter every 16 ns; and
wherein constructing the input block involves:
concatenating the truncated cipher counter with a block counter to obtain a 50-bit value, wherein the block counter is 7-bit long and reset to zero for every data frame; and
duplicating the 50-bit value to fill a 128-bit space for the input block starting from the least significant bit.

22. The computer-readable storage medium of claim 21, wherein encrypting the data frame involves:
encrypting the input block with the session key based on AES to obtain an output block; and performing an exclusive OR (XOR) operation on a 128-bit block within the data frame and the output block to obtain a 128-bit block of encrypted data for the data frame, wherein the 128-bit block corresponds to the block counter.

23. The computer-readable storage medium of claim 21, wherein the method further comprises sending the 16 most significant bits of the cipher counter to a optical network unit (ONU), so that the ONU's cipher counter can be synchronized.

24. The computer-readable storage medium of claim 21, wherein incrementing the 48-bit long untruncated cipher counter involves:

incrementing the MPCP counter every 16 ns;

maintaining a 16-bit cycle counter which is incremented when the MPCP counter rolls over;

maintaining a register for the ONU which contains the value of the cycle counter when an encryption key associated with the ONU is last changed;

obtaining a 16-bit value by subtracting the value in the register from the value of the cycle counter; and obtaining the 48-bit long cipher counter by concatenating the 16-bit value with the MPCP counter.

* * * * *